United States Patent
Young et al.

(10) Patent No.: US 10,605,504 B2
(45) Date of Patent: Mar. 31, 2020

(54) EXTERNAL SEPARATOR (71) Applicants: Terence William Thomas Young, Gravesend (GB); John Michael Roll, Fawkham (GB)

(72) Inventors: Terence William Thomas Young, Gravesend (GB); John Michael Roll, Fawkham (GB)

(73) Assignee: J&E HALL LIMITED, Dartford, Kent (GB)

( * ) Notice: Subject to any disclaimer, the term of this patent is extended or adjusted under 35 U.S.C. 154(b) by 0 days.

(21) Appl. No.: 15/101,495

(22) PCT Filed: Oct. 9, 2014

(86) PCT No.: PCT/GB2014/000400
§ 371 (c)(1),
(2) Date: Jun. 3, 2016

(87) PCT Pub. No.: WO2015/082867
PCT Pub. Date: Jun. 11, 2015

(65) Prior Publication Data
US 2016/0313038 A1 Oct. 27, 2016

(30) Foreign Application Priority Data
Dec. 6, 2013 (GB) .................................. 1321629.6

(51) Int. Cl.
*F25B 43/02* (2006.01)
*B01D 45/08* (2006.01)
(Continued)

(52) U.S. Cl.
CPC .............. *F25B 43/02* (2013.01); *B01D 45/08* (2013.01); *B01D 45/12* (2013.01); *B01D 45/14* (2013.01);
(Continued)

(58) Field of Classification Search
CPC .. F25B 43/02; F25B 2400/02; F25B 2400/23; F25B 2500/00; B01D 45/14; B01D 45/08; B01D 45/12
(Continued)

(56) References Cited

U.S. PATENT DOCUMENTS 4,906,264 A 3/1990 Szymaszek et al.
5,676,717 A 10/1997 Cope et al.
(Continued)

FOREIGN PATENT DOCUMENTS

CN 1752870 A 3/2006
CN 2771767 Y 4/2006
(Continued)

OTHER PUBLICATIONS

Chinese (CN) Patent Office, CN application 2014-800658419, Office Action (OA) dated Mar. 5, 2019 (English translation attached).
(Continued)

*Primary Examiner* — David J Teitelbaum
(74) *Attorney, Agent, or Firm* — Agris & Von Natzmer, LLP; Joyce Von Natzmer (57) ABSTRACT

A ducted separator in a compressor-based cooling assembly is connected to an oil/gas outlet of the compressor. The ducted separator is a pipe with at least one bend in it which collects oil in a manner which can achieve 98% oil carry over efficiency. The ducted separator may optionally be connected to a second phase separator such as a centrifugal cylinder. In that case, the height of the centrifugal cylinder can be significantly reduced compared with conventional arrangements. Alternatively, a simpler impingement surface such as one or more baffles may be used as the second phase separator or just a collection chamber.

17 Claims, 8 Drawing Sheets

(51) Int. Cl.
*B01D 45/12* (2006.01)
*B01D 45/14* (2006.01)

(52) U.S. Cl.
CPC ....... *F25B 2400/02* (2013.01); *F25B 2400/23* (2013.01); *F25B 2500/01* (2013.01)

(58) Field of Classification Search
USPC .......................................................... 62/470
See application file for complete search history.

(56) References Cited

U.S. PATENT DOCUMENTS

| | | | |
|---|---|---|---|
| 8,945,266 B2 | 2/2015 | Yoshimura et al. | |
| 2002/0134102 A1* | 9/2002 | Morimoto | B01D 45/12 62/470 |
| 2006/0061799 A1 | 3/2006 | Okamoto et al. | |
| 2007/0251264 A1 | 11/2007 | Jang et al. | |
| 2008/0011550 A1 | 1/2008 | Dunn et al. | |
| 2012/0151888 A1 | 6/2012 | Yoshimura et al. | |

FOREIGN PATENT DOCUMENTS

| | | |
|---|---|---|
| CN | 102553359 A | 7/2012 |
| EP | 1731856 A2 | 12/2006 |
| EP | 2020577 A2 | 2/2009 |
| JP | 2002213843 A | 7/2002 |
| JP | 2004077033 A | 3/2004 |
| JP | 2007315366 A | 12/2007 |
| JP | 2010181090 A | 8/2010 |
| JP | 2012125727 A | 7/2012 |
| JP | 2013210188 A | 10/2013 |

OTHER PUBLICATIONS

Chinese (CN) Patent Office, CN application 2014-800658419, Office Action (OA) dated Jun. 5, 2018 (English translation attached).
Japanese (JP) Patent Office, JP application 2016-535101, Office Action (OA) dated Mar. 8, 2019 (English translation attached).
Japanese (JP) Patent Office, JP application 2016-535101, Office Action (OA) dated Aug. 12, 2018 (English translation attached).

* cited by examiner

FIGURE 1
CONVENTIONAL

FIGURE 2
CONVENTIONAL

EXTERNAL SEPARATOR

CROSS-REFERENCE TO RELATED APPLICATIONS

This is the U.S. national stage of International application PCT/GB2014/000400, filed Oct. 9, 2014 designating the United States and claiming priority to GB application no. 1321629.6, filed Dec. 6, 2013.

The present invention relates to oil separators. It finds particular application in cooling systems such as air conditioning or refrigeration systems, where oil exiting with the discharge gas from a compressor is required to be separated from the gas stream, for efficient heat exchanger operation.

Figure 1:
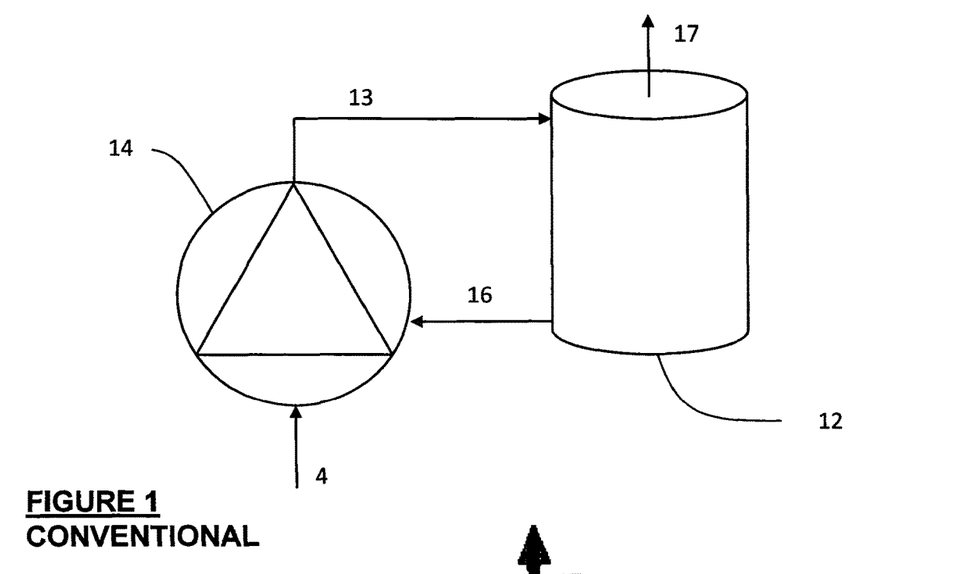
FIG. 1 shows a block diagram of known air conditioning equipment.

FIG. 1 shows an overview of known air conditioning equipment comprising a compressor 14 and an external oil separator 12, these having a connection 17 to heat exchangers (not shown). During a compression process, gas enters the compressor 14 under suction 4. Oil is injected into the compressor 14 to improve efficiency and to provide cooling of the compressor 14. A gas and oil mixture is created in the compressor 14 which is delivered via a first inlet pathway 13 to the oil separator 12. Once separated, the gas is delivered via the connection 17 to the heat exchangers and the oil is delivered via a third pathway 16 back to the compressor 14. The quantity of oil allowed to enter a cooling system such as an air conditioning system must be kept to a minimum if heat exchanger efficiency is to be maintained. For example, oil carry over limits have been approximately 2% for direct expansion system types.

Oil separation is a requirement for efficient operation of any cooling system such as a refrigeration or air conditioning system operating with a compressor 14 which requires oil for lubrication and/or sealing and/or cooling, unless the oil is completely isolated from the compression process. Such oil separators 12 tend to adopt one or more of the standard oil separation processes:

1. Impingement
2. Velocity drop out
3. Centrifugal effect
4. Coalescence

Figure 2:
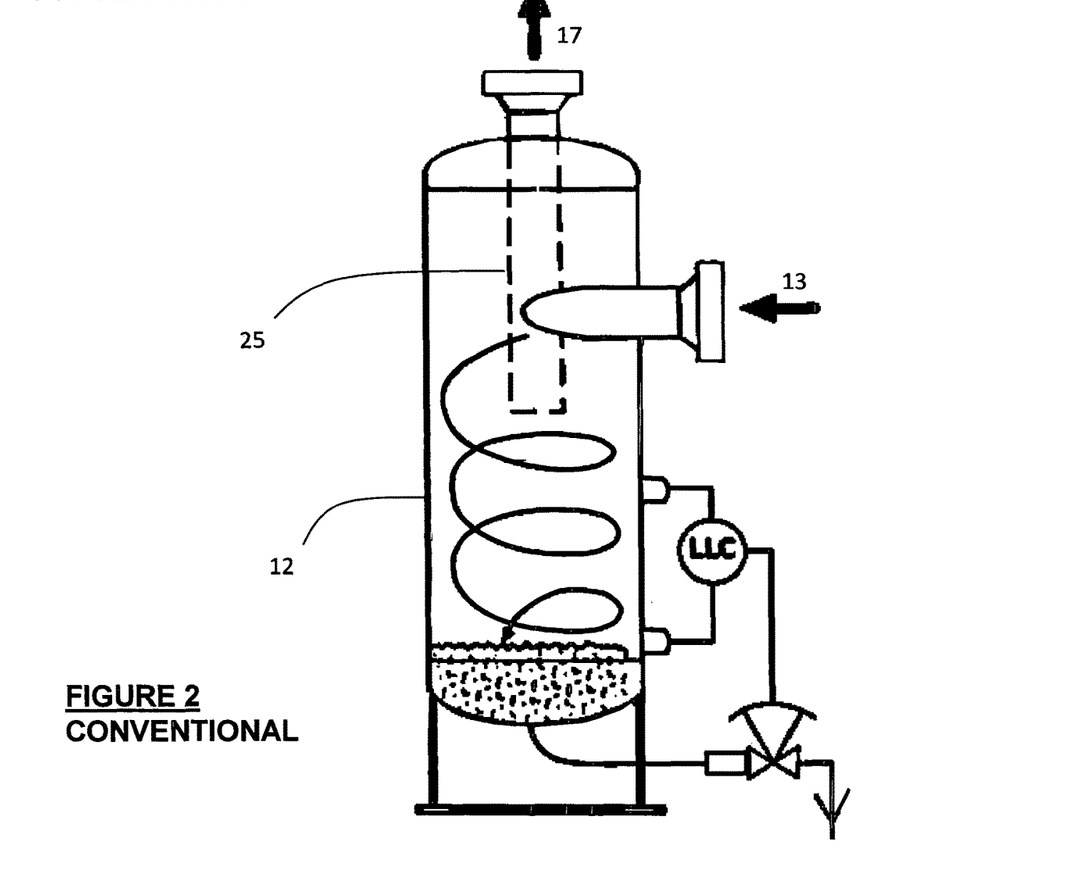
FIG. 2 shows in side elevation a conventional oil/gas separator for use in the equipment of FIG. 1.

Referring to FIG. 2, a known form of oil separator 12 is cyclonic. The gas and oil mixture is delivered via a tangential pathway 13 into a cylinder with a central pipe 25 known as a vortex finder. The vortex finder encourages the mixture initially to follow a downward spiral in the cylinder. The heavier oil is thrown onto the sides of the cylinder where it collects and falls to the base. However, the lighter gas is encouraged under the pressure in the cylinder to be expelled through the vortex finder 25.

According to embodiments of the invention in its first aspect, there is provided an oil/gas separator comprising a duct having an inlet for receiving an oil/gas mixture, the duct having an inner surface extending at least partially in a horizontal direction and providing a bend or series of bends, the duct providing at least partial separation of the oil/gas mixture, in use, by both gravitational and centrifugal oil collection onto the inner surface, and the duct having an outlet for delivery of gas and collected oil.

Unlike conventional separators, a separator according to an embodiment of the present invention is not primarily dependant on gas velocity. There are however potential constraints on gas velocity in the duct. The maximum gas velocity is limited by the maximum allowable pressure drop during travel in the duct. In a cooling system, a large pressure drop may mean that the cooling system efficiency falls to an unacceptable level. The pressure drop in a cooling system might lie in the range 200 to 400 mbar for example. The minimum gas velocity in the duct is limited by the maximum acceptable separator size since a slower-moving mixture will generally require a larger diameter duct and vessel sizes, which may not suit a final installation.

The separator may further comprise an impingement surface for capturing the collected oil. The impingement surface may be provided by a further oil/gas separation arrangement such as a centrifuging cylinder, the duct being configured to deliver oil and gas tangentially into the centrifuging cylinder. The centrifuging cylinder may have an upper gas outlet, such as a top vent, and a lower oil outlet such as a reservoir outlet or a tangential delivery outlet.

Embodiments of the invention have been found to provide significantly lower oil carry over, for example 0.5% or lower. They can provide significant improvements in efficiency per unit size oil/gas separator, together with manufacturing simplicity and can operate across a wide range of operating conditions.

An oil/gas separator according to an embodiment of the invention will now be described, by way of example only, with reference to the accompanying drawings in which.

The drawings are not drawn to scale.

Figure 3:
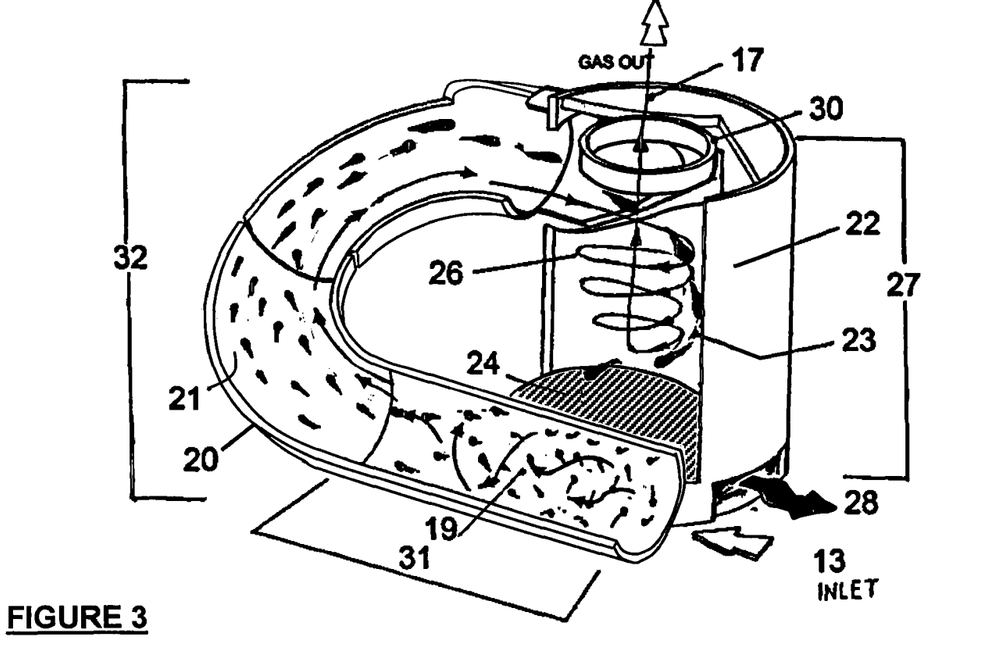
FIG. 3 shows in partial section and quarter view from above, an oil/gas separator comprising a curved duct according to a first embodiment of the invention.
Figure 4A:
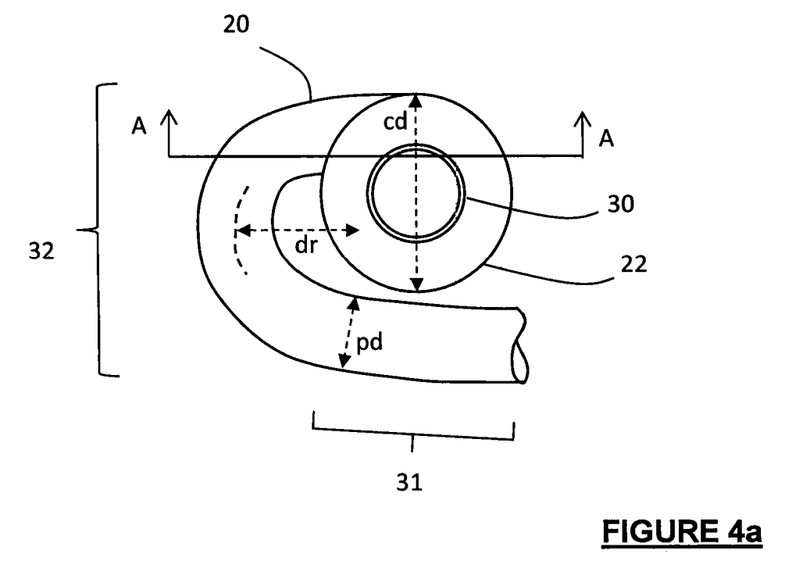
FIGS. 4a and 4b show the separator of FIG. 3, from above, using different curves of the duct.
Figure 4B:
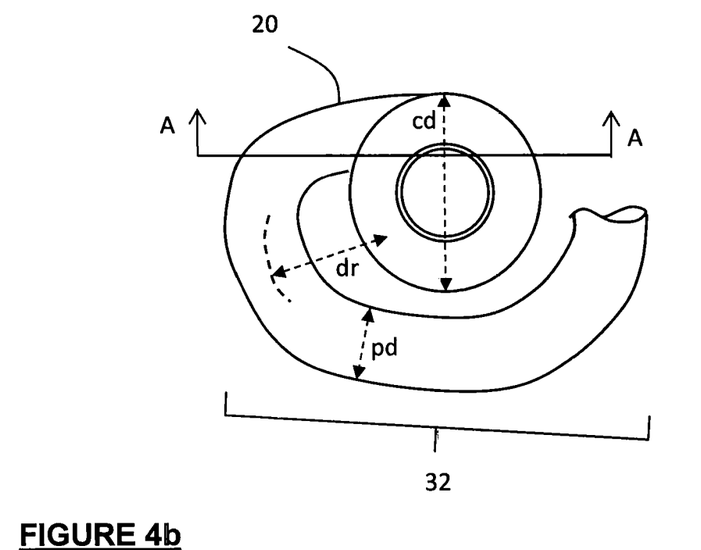
Figure 5:
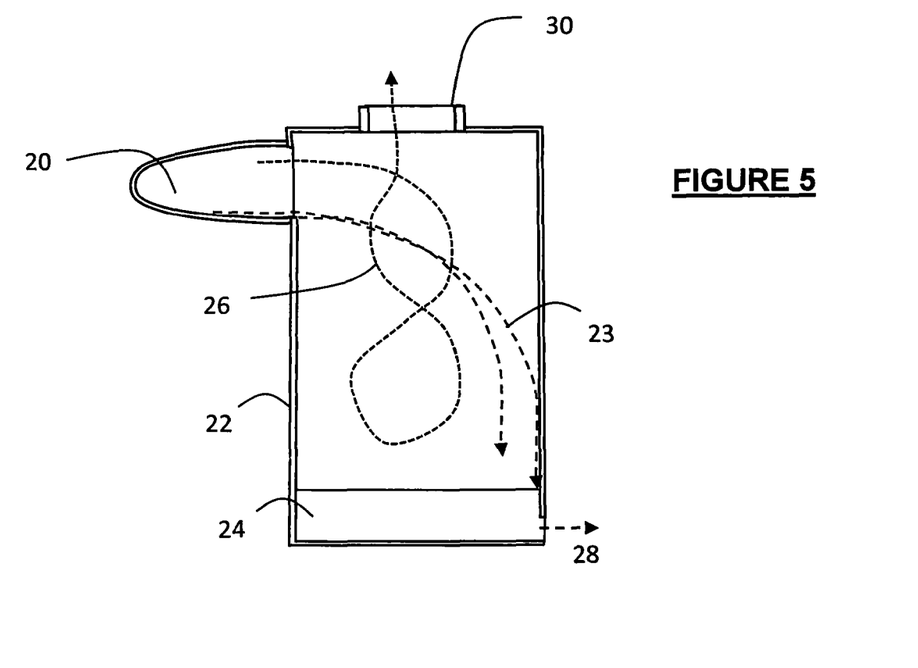
FIG. 5 shows the separator of FIG. 4a in cross section along the line A-A, viewed in the direction indicated by the arrows.

Referring to FIGS. 3 to 5, the oil/gas separator comprises a duct 20 with one or more bends in it, the duct discharging to a centrifugal cylinder 22. Gas mixed with oil particles is received into an inlet 13 of the duct 20 from the discharge port of a compressor (not shown). In the received mixture 19, particles of oil entrained in the gas stream are both randomly distributed and multi directional. The first separation phase is created using a straight length 31 of the duct 20 combined with a bend section 32 coupling the straight length 31 into the cylinder 22.

The bend section 32 could show a single bend or a series of bends providing a total change in direction with respect to the axial direction of the inlet in the range from 100 degrees to 270 degrees. The bend section 32 extends at least partially in a horizontal direction but could be tilted in one or more other directions. For example, the series of bends need not be in the same plane.

In this first separation phase, oil particles are coalesced by a combination of factors: surface tension both between the particles and with the inner surface 21 of the duct 20; the centrifugal forces of the bend 32; and the effect of gravity. This combination ensures a two part oil and gas separation first phase before entering into the centrifugal second separation phase 22.

Entering the second separation phase 22, partly separated gas and oil pass into an impingement separation stage constructed to prevent re-entrainment. This phase incorporates the centrifuging cylinder 22 designed to further separate the oil 23 from the gas stream 26 thereby preventing re-entrainment. Entry into this second stage 22 can be tangentially on one or other side of the cylindrical vessel 22. Separated oil 23 falls to the bottom of the cylinder 22 where it can form an oil reservoir 24 suitable for supply as required. Gas 17 with the oil removed exits through a port 30 at the top of the cylinder 22.

An important feature of this design is the removal of the vortex finder 25 seen in FIG. 2 which is a common feature of traditional cyclone separators. Its removal simplifies the design. Indeed, efficiency has been found to be improved by the removal of the vortex finder 25.

Oil for return to the compressor 14 requires velocity. This can be generated by a head of oil collected in a reservoir 24 or by imparting velocity otherwise to the oil. For example, if the oil reservoir 24 in the cylinder 22 provides sufficient head, the oil can be discharged through a port 28 for delivery back to the compressor 14.

Alternatively, the oil 23 can be delivered to an oil reservoir elsewhere. In a further embodiment, the rotation of the oil within the second stage separation cylinder 22 may be used together with a tangential position of the oil outlet 28 to provide the required outlet velocity and thereby reduce the required oil head and thus system oil fill.

An important feature of embodiments of the invention is that the height 27 of the second stage cylinder 22 can be reduced when compared with known cyclone arrangements. This can reduce the overall height of the compressor/separator assembly. In embodiments of the invention, only partial circulation of the oil 23 around the cylinder 22 is necessary to maintain the oil and gas separation from the first phase provided by the duct 20. Both the height and the internal diameter of the cylinder 22 might be two or three times the internal diameter of the duct 20. For example, for a duct 20 of 100 mm diameter, the height of the cylinder can be 200 to 300 mm and the radius of the cylinder 22 need only be 100 mm to 150 mm.

Referring to FIG. 4a, the relationship between the cross sectional diameter pd of the inner surface of the first phase 20 ("pipe diameter") and the cylinder diameter cd of the second phase vessel 22 is critical for optimum performance. If the pipe diameter pd is too small, pressure drops in the duct 20 are too high which reduces the cooling system efficiency as mentioned above. A pipe diameter pd for the first phase 20 which is of the order of one third to one half of the diameter cd of the second stage vessel 22 has been found to be about the right relationship. A working example is a duct 20 having a nominal bore size pd of four inches with a bend section 32 having duct radius dr six inches to the centre of the pipe 20. The second phase vessel 22 would then have an internal diameter cd of eight to twelve inches.

In FIG. 4a, the bend section 32 of the duct 20 provides a change in direction from the straight section 31 to the inlet to the second stage cylinder 22 of slightly less than 180°. FIG. 4b shows a separator in which the bend section 32 provides a change in direction of slightly less than 270°.

Figure 6:
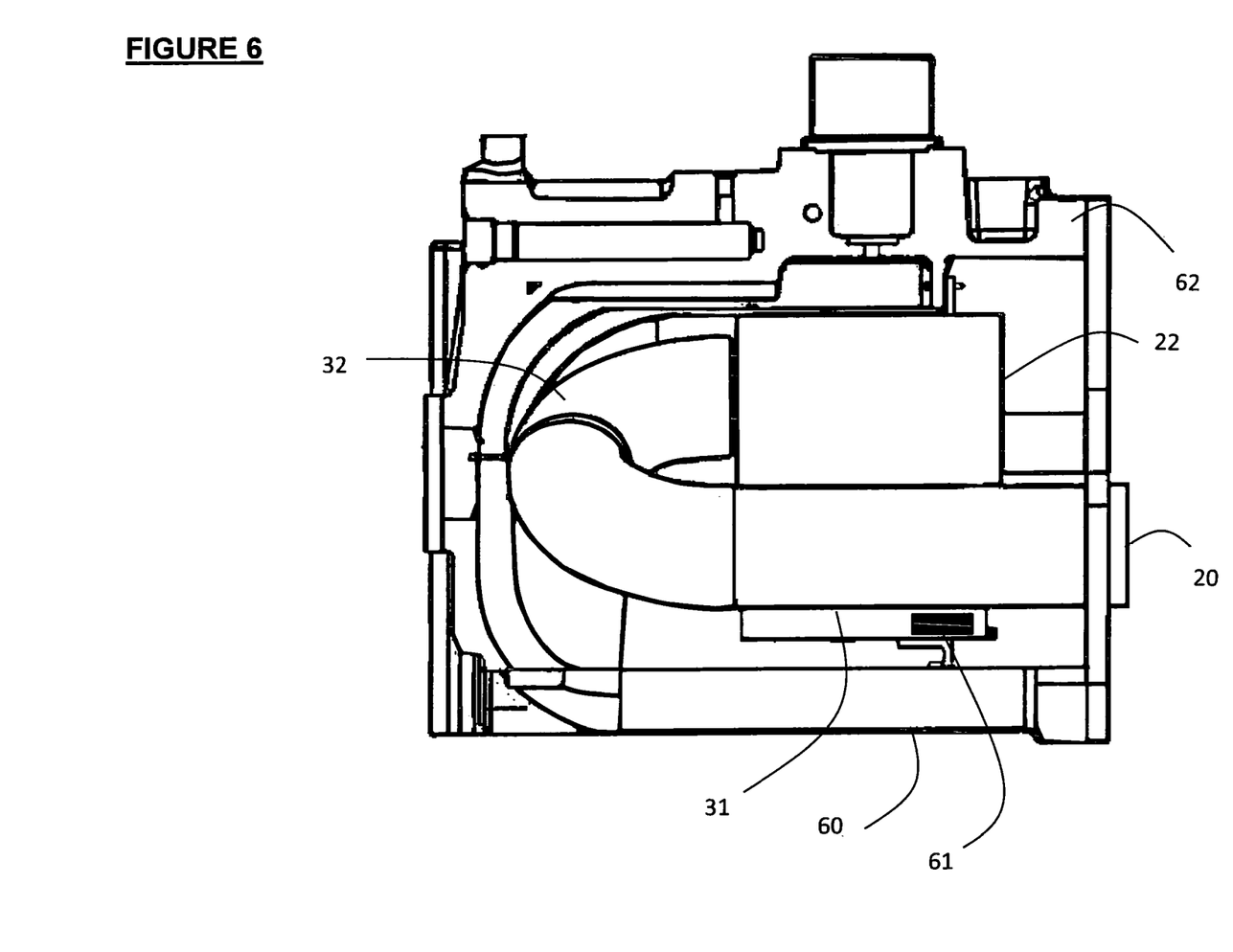
FIG. 6 shows in side elevation, an oil/gas separator according to a second embodiment of the invention installed in an external high pressure housing shown in cross section and having an oil reservoir in the external housing.
Figure 7:
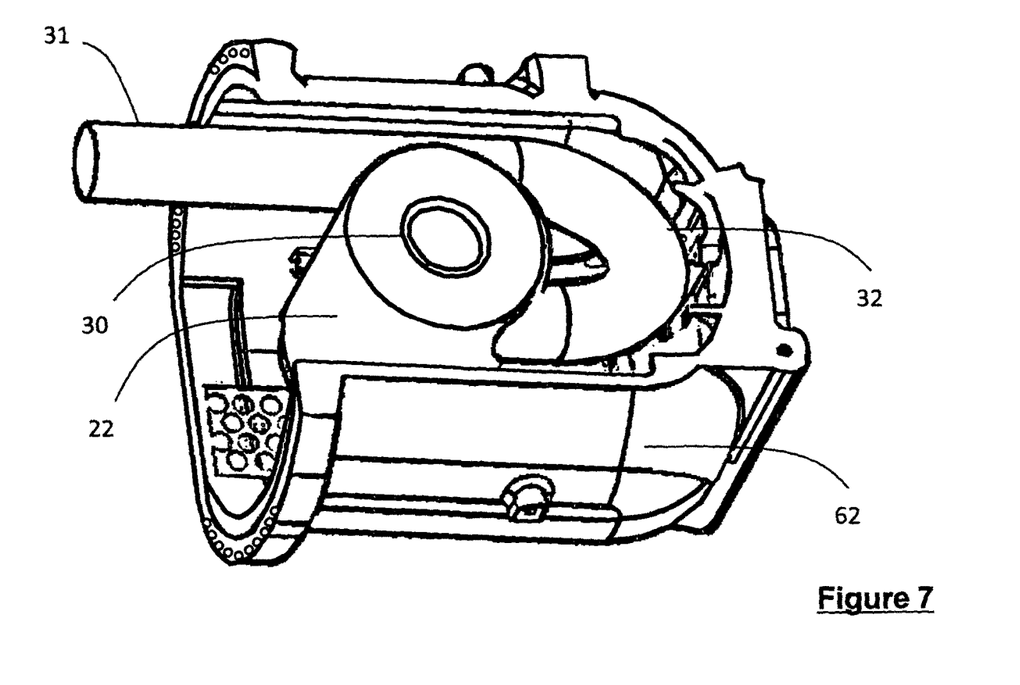
FIG. 7 shows the separator of FIG. 6, in three quarter view from above.

Referring additionally to FIGS. 6 and 7, for space saving reasons the duct 20 may optionally be tilted so that the bend section 32 is not horizontal but climbs (as shown in FIG. 6) and/or falls between the straight section 31 of the duct 20 and the delivery point to the second vessel 22. In the embodiment of FIG. 6, the duct 20 and the second vessel 22 are housed in an external housing 62 and the separated oil is collected via an outlet 61 of the second vessel 22 in a reservoir 60 in the base of the external housing 62. The optimal duct radius dr to the centre of the duct 20 at the or each bend may vary and is likely to be affected by the number and tilt of bends in the bend section 32. It is not essential that the duct radius is constant through the length of the duct 20. If not, then the references to duct radius dr can usually be taken to mean average or minimum duct radius. The important factor however will usually be the pressure drop in the duct.

For an integral separator version where the centrifugal cylinder 22 is contained within a separate external pressure retaining casing 62, providing the oil reservoir 60, the cylinder 22 includes a slot 61 at the bottom of the cylinder wall, which uses the centrifugal effect on the oil to improve the exit of the oil from the cylinder 22.

Figure 8:
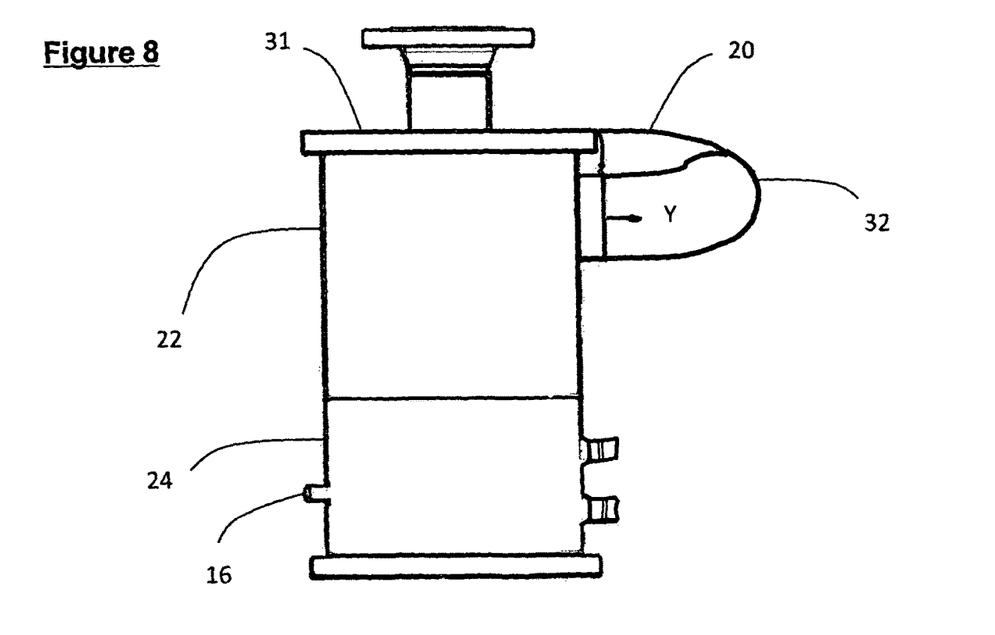
FIG. 8 shows in side elevation, an oil/gas separator according to a third embodiment of the invention having an integral oil reservoir.

Referring to FIG. 8, in another embodiment the duct 20 is tilted so that the section containing the bend or bends 32 drops from the straight section 31 of the duct 20 to the delivery point to the second vessel 22. In this embodiment, the second vessel 22 has an integral oil reservoir 24 in its own base.

Figure 9:
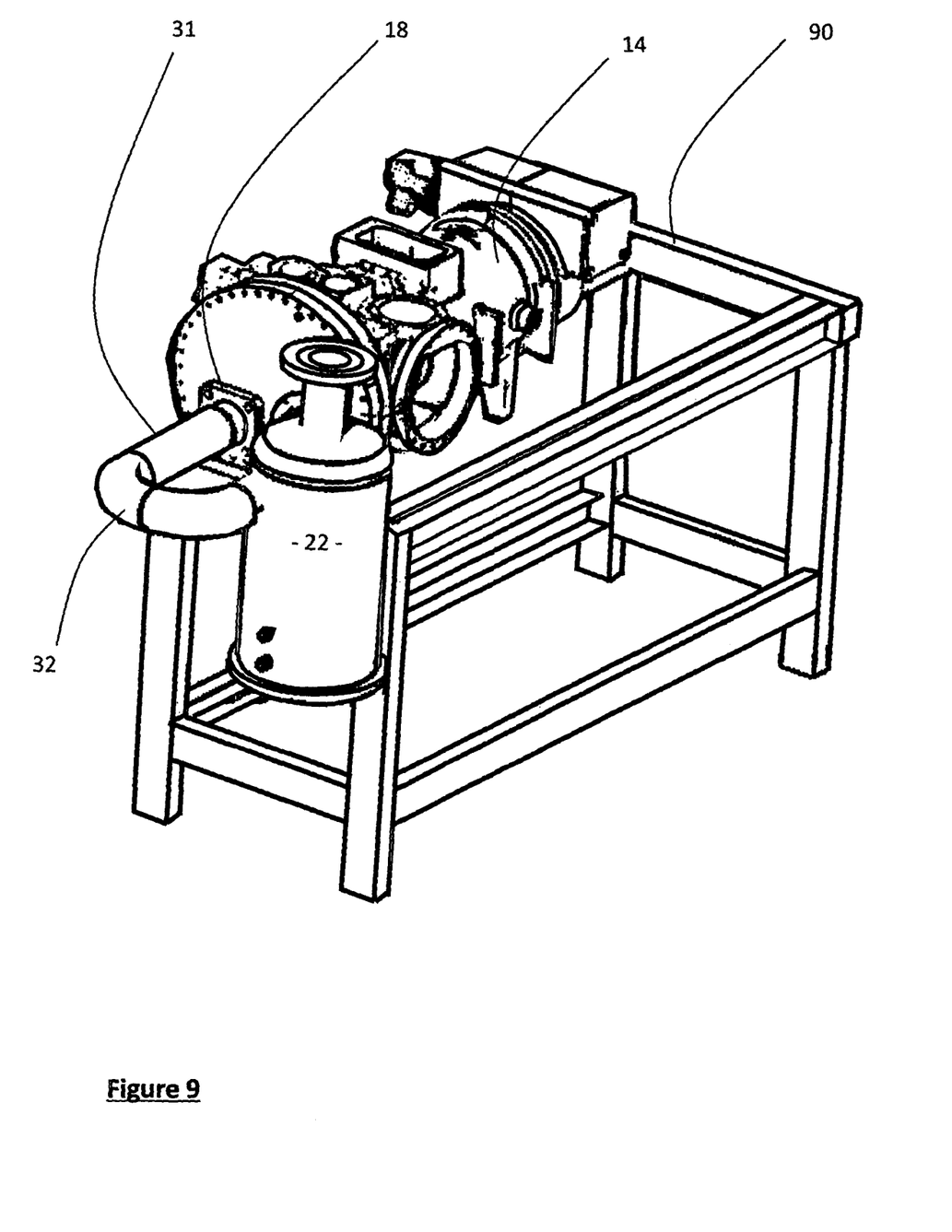
FIG. 9 shows the separator of FIG. 8 attached to a compressor, in quarter view from above.

FIG. 9 shows the duct 31, 32 and second vessel 22 of the embodiment of FIG. 8 connected to a discharge port 18 of a compressor 14 and its supporting frame 90 to receive the oil/gas mixture to be separated.

In general, baffles may be added to the oil reservoir section of the second stage cylindrical vessel 22 to reduce the oil turbulence and allow a conventional oil drain arrangement from a relatively calm and stable oil reservoir 24 in the cylinder 22.

Figure 10:
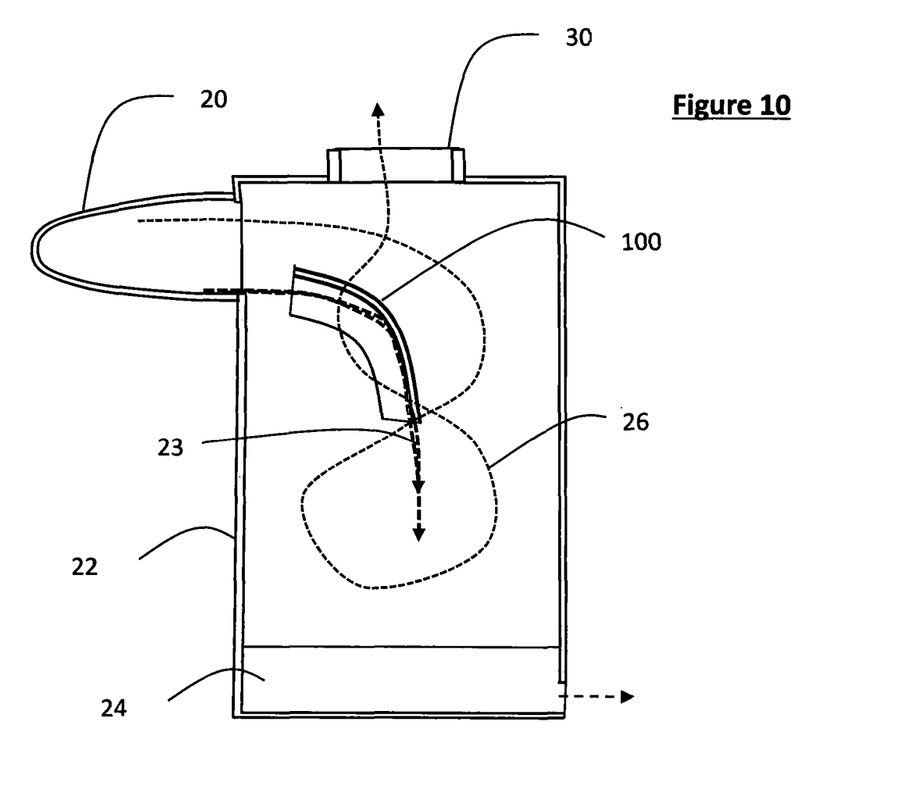
FIG. 10 shows a separator having a baffle instead of a centrifugal second stage, in cross section equivalent to that of FIG. 5.
Figure 11:
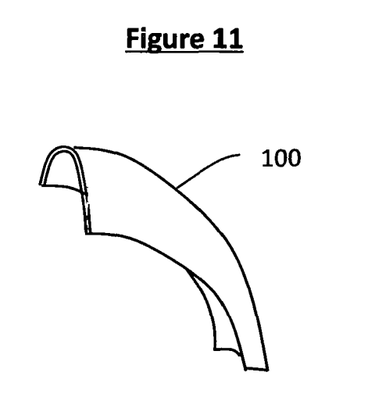
FIG. 11 shows the baffle of FIG. 10 in quarter view from the side.

Referring to FIGS. 10 and 11, one or more angled impingement plates 100 (flat or curved) may be used either to augment or replace centrifugal separation in the second vessel 22. Such a baffle or baffles 100 acts to deflect the oil flow 23 away from the gas flow 26 which flows out of the top 30 of the oil containment vessel. The oil can be collected in an integral reservoir 24 or elsewhere, as described above. It has been found that this simple use of one or more baffles 100 in combination with the bend section 32 of the duct 20 produces of the order of 98% efficient nominal oil separation whereas the use of a centrifugal second stage 22 raises that to an efficiency of the order of 99.5% nominal oil separation.

Figure 12:
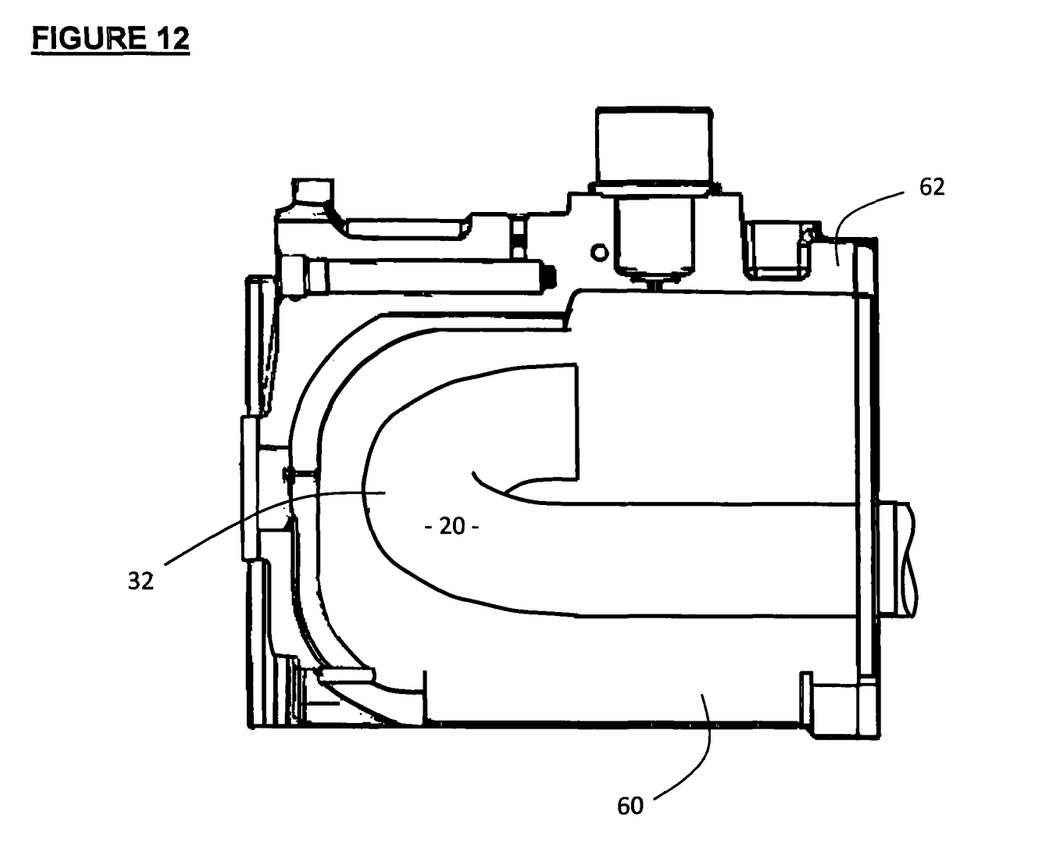
FIG. 12 shows in cutaway side elevation a separator comprising a curved duct with no additional cylinder or other impingement surface.

Referring to FIGS. 6, 7 and 12, it is possible to achieve 98% oil carry over efficiency when the bent duct 20 flows directly into the external housing 62, without any deflectors or cylindrical second stage. Thus FIG. 12 shows a variation of the arrangement of FIGS. 6 and 7 in which there is no cylindrical vessel 22 or other second stage. Collected oil simply leaves the duct 20 to be collected in the oil reservoir Embodiments of the invention can be used with high velocity oil/gas mixtures, for example in the high pressure side of a refrigeration system. Indeed, as shown in FIGS. 6 and 7, embodiments of the invention may comprise a duct 20 having a bend in it, the duct having an inlet connected directly to the discharge port 18 of a cooling compressor 14.

The invention claimed is:

1. An oil/gas separator comprising:
   a duct,
   the duct having an inlet for receiving an oil/gas mixture under pressure,
   the duct having an inner surface extending at least partially in a horizontal direction and providing a bend or series of bends,
   the duct providing at least partial separation of the oil/gas mixture, in use, by both gravitational and centrifugal oil collection onto the inner surface, and
   the duct having an outlet for delivery of gas and collected oil,
   a centrifuging cylinder providing an impingement surface for capturing the collected oil and having a circumference,
   the outlet of the duct entering the centrifuging cylinder tangentially and the duct being configured to deliver oil and gas tangentially into the centrifuging cylinder, wherein the separator is adapted to be used with a compressor, wherein the centrifuging cylinder has a tangential delivery outlet formed as an elongated slot in a wall of the centrifuging cylinder said slot having a first end at a first point on the circumference of the cylinder and a second end at a second point on the circumference of the cylinder, the tangential delivery outlet thus being adapted to deliver oil at a velocity equal to that required to match the flow rate in the system oil pipe required by the compressor, by virtue of a rotation of the oil within the centrifuging cylinder.

2. The separator according to claim 1, wherein a height of the cylinder lies in the range two to three times the average internal diameter of the duct.

3. The separator according to claim 1, wherein an internal diameter of the cylinder lies in a range two to three times an average internal diameter of the duct.

4. The separator according to claim 1, wherein the average internal diameter of the duct lies in a range of 50 mm to 200 mm.

5. The separator according to claim 4, wherein the average internal diameter of the duct lies in the range of 75 mm to 150 mm.

6. The separator according to claim 1, further comprising a housing connected to the duct outlet to receive the gas delivered and the oil collected, and wherein the impingement surface is provided by one or more baffles mounted in the housing.

7. The separator according to claim 1, wherein the duct has a straight section delivering the oil/gas mixture to a bend section.

8. The separator according to claim 1, wherein the duct provides a total change in direction with respect to an axial direction of the duct inlet which lies in the range from 100 degrees to 270 degrees.

9. The separator according to claim 1, wherein the bend or series of bends of the duct is at least partially tilted.

10. The separator according to claim 1, further comprising an oil reservoir for holding the oil collected and any additionally separated oil.

11. A cooling assembly comprising a compressor having an oil/gas outlet connected to a separator according to claim 1, the separator being incorporated in a high pressure side of the cooling assembly.

12. The cooling assembly according to claim 11, wherein a pressure drop separator in use lies in a range of 200 to 400 m bar.

13. The separator according to claim 1, wherein the separator is connected to the compressor.

14. The separator according to claim 1, further comprising an oil reservoir for holding the oil collected and any additionally separated oil, and wherein the impingement surface is provided by a centrifuging cylinder, the centrifuging cylinder having an outlet to the oil reservoir.

15. The separator according to claim 1, wherein said tangential delivery outlet of the centrifuging cylinder is located at the bottom of the cylinder where oil can be collected.

16. The separator according to claim 1, wherein the duct has a bend having a radius greater than a radius of the centrifuging cylinder.

17. The separator according to claim 1, wherein the tangential delivery outlet is adapted to deliver the oil back to the compressor.

* * * * *

UNITED STATES PATENT AND TRADEMARK OFFICE
CERTIFICATE OF CORRECTION

| | | |
|---|---|---|
| PATENT NO. | : 10,605,504 B2 | Page 1 of 1 |
| APPLICATION NO. | : 15/101495 | |
| DATED | : March 31, 2020 | |
| INVENTOR(S) | : Young et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this
Sixth Day of December, 2022

Katherine Kelly Vidal
*Director of the United States Patent and Trademark Office*